Oct. 15, 1968  E. E. JOHNSON  3,405,540

COUPLINGS

Filed May 11, 1966  2 Sheets-Sheet 1

INVENTOR
EDMOND ERIC JOHNSON
By Young + Thompson
ATTYS.

United States Patent Office 3,405,540
Patented Oct. 15, 1968

3,405,540
COUPLINGS
Edmond Eric Johnson, 19 13th St. (P.O. Box 545),
Chingola, Zambia
Filed May 11, 1966, Ser. No. 549,369
Claims priority, application Republic of South Africa,
May 11, 1965, 65/2,462
5 Claims. (Cl. 64—19)

ABSTRACT OF THE DISCLOSURE

A resilient, self-centering coupling, particularly suitable for vehicle suspensions, which is biased toward a normal central position and which is arranged to maintain a pair of coupled members in fixed spaced relationship. A connecting link is disposed between a pair of spaced-apart convex outer bearing surfaces and presents at each end a convex inner bearing surface engaging the outer bearing surface at that end. The inner and outer bearing surfaces are resiliently urged into contact with each other and are relatively movable in contacting relationship to permit relative movement of the outer bearing surfaces in substantially parallel planes located transversely to the connecting link with the spacing between the planes remaining substantially constant. The outer bearing surfaces are resiliently biased toward a normal position in which the connecting link is located substantially at right angles to the parallel planes in which the outer bearing surfaces are movable. Upon displacement of the outer bearing surfaces from their normal position, the connecting link is displaced from a right angular relationship to the parallel planes without the spacing of the outer bearing surfaces being substantially changed.

---

This invention relates to couplings.

It is an object of the present invention to provide a new and improved coupling which applicant believes will have numerous useful applications, such as, for example, in vehicle suspensions. For the purposes of this specification, the term "vehicle" is intended to signify not only road vehicles but also aircraft.

According to the invention a coupling includes a pair of spaced apart outer bearing surfaces; a connecting link extending between the outer bearing surfaces; and an inner bearing surface on the connecting link at each end thereof and engaging the outer bearing surface at that end, at least one of the bearing surfaces at each end of the connecting link being curved and the inner and outer bearing surfaces at each end of the connecting link being relatively movable in contact with each other thereby to permit limited relative movement of the outer bearing surfaces in substantially parallel planes located transversely to the connecting link with the spacing between the planes remaining substantially constant.

The inner and outer bearing surfaces may be relatively movable with a sliding and/or rolling action.

Preferably, the inner and the outer bearing surfaces at each end of the connecting link are curved.

Retaining means may be provided at each end of the connecting link for keeping the inner and outer bearing surfaces in contact with each other.

Preferably, the inner and outer bearing surfaces are resiliently retained in contact with each other.

The connecting link may include a head at each end, each head presenting an outwardly directed inner bearing surface at its outer end and presenting a spherical guide surface towards its inner end, the retaining means at each end of the connecting link presenting a complementary socket rotatably receiving the spherical guide surface of the associated head.

Preferably, the retaining means at each end of the connecting link include a mounting member fast with the outer bearing surface; a guide member presenting the complementary socket and movable relative to the mounting member in a longitudinal direction relative to the connecting link; and resilient means between the guide member and the mounting member biasing the guide member towards the outer bearing surface.

A plurality of couplings according to the invention may be utilized rotatably to couple together two rotary members. To this end, a plurality of couplings may be mounted between a pair of co-axial rotary members, the couplings being arranged in circumferential spaced relationship to each other about a common rotational axis of the rotary members. Upon rotation of one of the rotary members about the common axis of rotation, the couplings are caused to rotate about the rotational axis and thereby to cause the other rotary member also to rotate about the common rotational axis. The couplings permit limited relative movement of the two rotary members in a direction transversely to the axis of rotation.

The couplings may be arranged resiliently to bias the two rotary members towards their co-axial disposition so that when the rotary members are relatively displaced transversely, they are urged back towards the co-axial disposition when the displacing influence is released.

A preferred embodiment of the invention will now be described by way of example with reference to the accompanying drawings in which.

Figure 1:
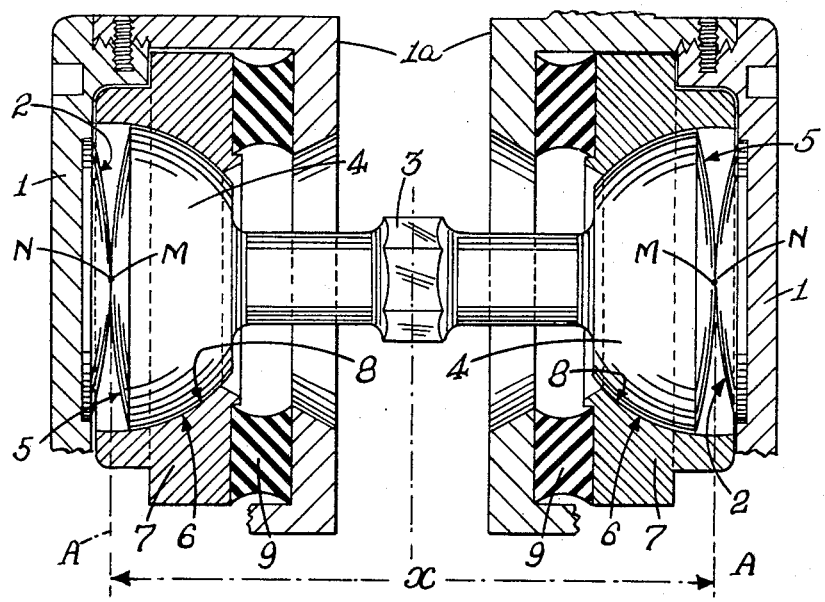
FIGURE 1 is a fragmentary diagrammatical representation of a coupling according to the invention in normal position.

A coupling according to the invention comprises a pair of spaced mounting members 1; a pair of spaced apart, inwardly directed, curved outer bearing surfaces 2 fast with mounting members 1; connecting link 3 extending between outer bearing surfaces 2; a head 4 on connecting link 3 at each end thereof; an outwardly directed, curved inner bearing surface 5 on the outer end of each head 4 and engaging the associated outer bearing surface 2; a spherical guide surface 6 towards the inner end of each head 4; a guide member 7 for each head 4, each guide member 7 being movable relative to the associated mounting member 1 longitudinally relative to connecting link 3 and each guide member 7 further presenting a complementary socket 8 rotatably receiving the spherical guide surface 6 of the associated head 4; and a resilient pad 9 between each guide member 7 and retaining portion 1a of the associated mounting member 1, each resilient pad 9 biasing its guide member 7 towards the associated outer bearing surface 2.

Resilient pads 9 are preferably pre-stressed before they are mounted so that they bias the coupling towards the normal position shown in FIGURE 1. By comparing FIGURES 1 and 2, it will be seen that the inner and outer bearing surfaces 2, 5 at each end of connecting link 3 are relatively movable in contact with each other to permit limited relative movement of outer bearing surfaces 2 in parallel planes A located transversely to connecting link 3. Outer bearing surfaces 2 are relatively movable through 360° in planes A located transversely to the plane of the paper.

The inner and outer bearing surfaces 2, 5 are relatively movable with a sliding and/or rolling action and the curvature of the bearing surfaces are such that upon the outer bearing surfaces 2 being relatively moved in planes A, the spacing x between the planes A remains substantially constant.

Figure 2:
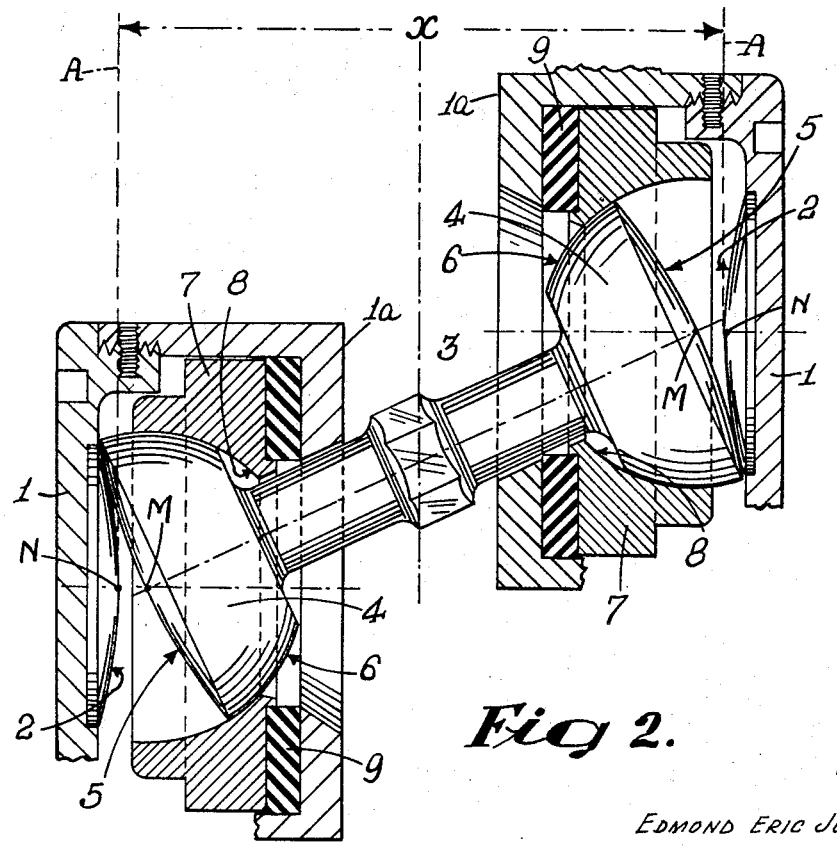
FIGURE 2 is a fragmentary diagrammatical representation of the coupling of FIGURE 1 in displaced position.

It will be clear from FIGURE 2 that when outer bearing surfaces 2 are relatively displaced from the normal position of FIGURE 1, the centre of curvature M of each inner bearing surface 5 moves away from the centre of curvature N of the associated outer bearing surface 2, thereby causing the associated spherical guide surface 6 to displace the associated guide member 7 away from the associated outer bearing surface 2 against the biasing action of the associated resilient pad 9. Relative movement of the outer bearing surfaces 2 are therefore resiliently damped and when the influence causing such relative movement is released, the biasing action of pads 9 reasserts itself to urge the coupling back towards the normal position of FIGURE 1.

Figure 3:
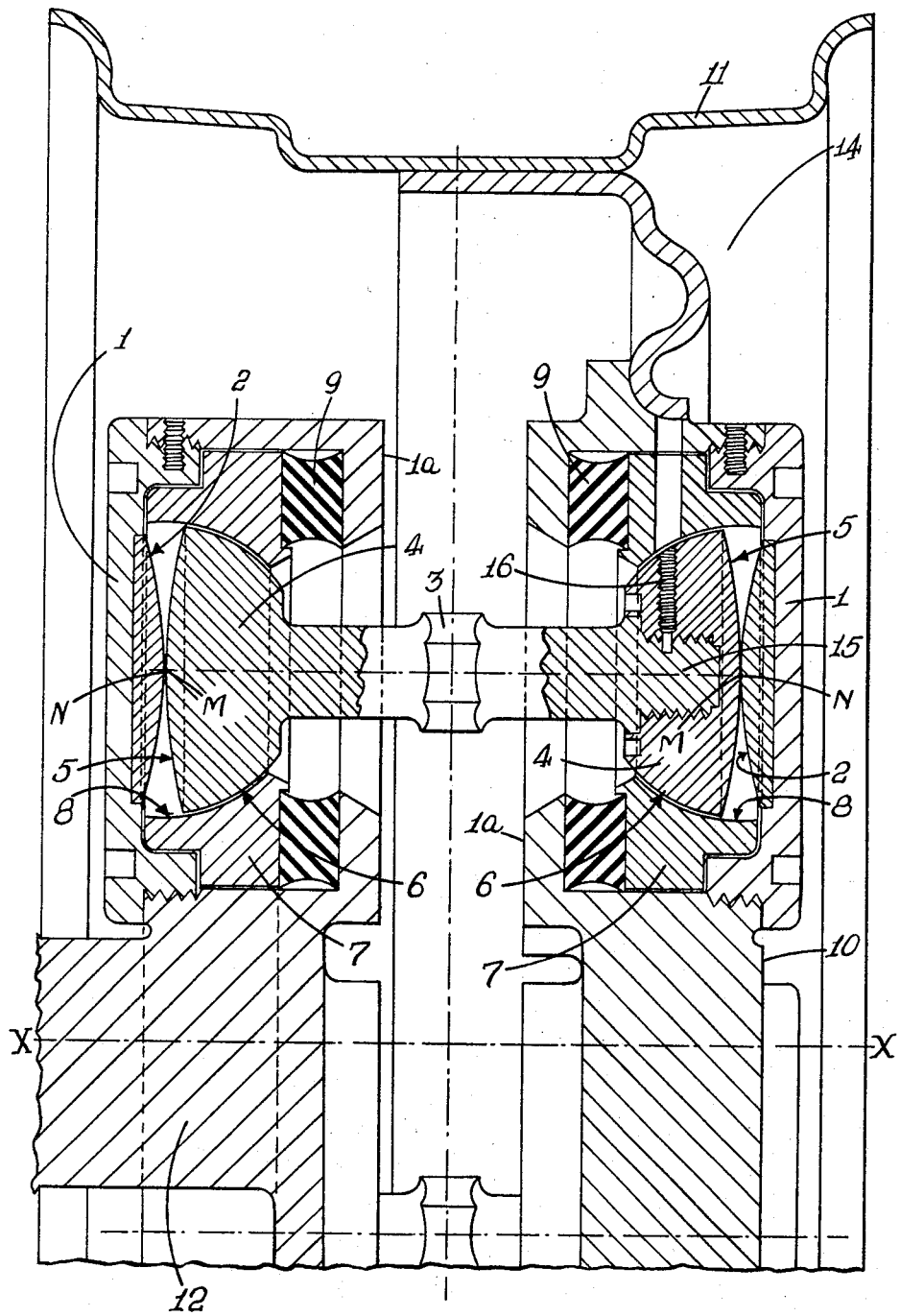
FIGURE 3 is a fragmentary elevational view of a vehicle suspension in which a wheel is mounted on a driven stub axle by means of a plurality of couplings similar to that of FIGURES 1 and 2.

Referring now to FIGURE 3, wheel 14 comprising hub 10, and tire receiving rim 11, is mounted by means of a plurality of couplings similar to that of FIGURES 1 and 2, on stub axle 12 which is adapted to be rotatably driven. The couplings, of which only one is shown, are mounted in circumferential spaced relationship to each other about the axis of rotation XX of stub axle 12 and wheel 14. The couplings are spaced radially from rotational axis XX. When stub axle 12 is rotatably driven, it causes the couplings to rotate with it about axis XX. The couplings transmit the rotation to wheel 14 which is also caused to rotate about axis XX.

It is believed that by mounting the wheels of a road vehicle with couplings according to the invention in the manner described with reference to FIGURE 3, it will be possible to dispense altogether with conventional suspensions, the couplings according to the invention providing suitable and adequate resilience between the wheels and the chassis of the vehicle.

It is believed further that the landing gear of aircraft can be improved by substituting a rigid strut for a conventional oleo leg and mounting one or more wheels on the rigid strut, each such wheel being resiliently mounted on the strut by means of one or more couplings according to the invention so that the coupling or couplings provide resilience between the wheel or wheels and an aircraft body on which the strut is mounted. It will be appreciated that the wheels are independently suspended on the rigid strut. It is believed that such a landing gear would be better able to accommodate shock upon landing at high speed, than conventional landing gear.

To permit the assembly of a coupling according to the invention, it is normally necessary for one of the heads 4 to be removable from the remainder of the connecting link 3. FIGURE 3 shows one way of removably mounting a head on connecting link 3, but it will be appreciated that any other suitable mounting arrangement may be used. It will be seen from the drawings that mounting members 1 have outer end portions which mount outer bearing surfaces 2 and are detachably mounted on the remainder of the mounting member with screw threaded engagement.

As shown in FIGURE 3, the right hand end of connecting link 3 is provided with a threaded spigot 15 releasably engaging a complementary threaded socket in right hand head 4. Grub screw 16 retains right hand head 4 in position on threaded spigot 15.

It will be appreciated that many variations in detail are possible without departing from the scope of the appended claims. For example, instead of removably mounting a head on connecting link 3 in the manner shown in FIGURE 3, the one end of link 3 may be splined and adapted to engage in a complementary socket in a removable head which is securable in position by means of a cotter.

Also, removable inner and outer bearing surfaces may be provided to permit replacement when such surfaces become worn. Replaceable inner bearing surfaces 5 may be presented by bearing elements which are removably mounted on the outer ends of heads 4, such as by means of a splined spigot and socket arrangement. Similarly, replaceable outer bearing surfaces 2 may be presented by bearing elements which are removably mounted on mounting members 1, such as by means of a splined spigot and socket arrangement.

What I claim is:

1. A coupling comprising means defining a pair of spaced-apart convex outer bearing surfaces; a connecting link disposed between said outer bearing surfaces; means defining a convex inner bearing surface fast with the connecting link at each end thereof and engaging a said outer bearing surface at that end, the inner and outer bearing surfaces at each end of the connecting link being relatively movable in contact with each other, means supporting said outer bearing surfaces for limited relative movement of the outer bearing surfaces in substantially parallel planes located transversely to the connecting link with the spacing between the planes remaining substantially constant; and control means at each end of the connecting link resiliently urging the inner and outer bearing surfaces into contact with each other and resiliently biasing the outer bearing surfaces toward a normal position in which the connecting link is located substantially at right angles to the planes in which the outer bearing surfaces are movable.

2. A coupling comprising means defining a pair of spaced-apart convex outer bearing surfaces; a connecting link disposed between the outer bearing surfaces; a head fast with the connecting link at each end thereof; each head having a convex inner bearing surface at the outer end thereof and engaging a said outer bearing surface at that end, the inner and outer bearing surfaces at each end of the connecting link being relatively movable in contact with each other, means supporting said outer bearing surfaces for limited relative movement of the outer bearing surfaces in substantially parallel planes located transversely to the connecting link with the spacing between the planes remaining substantially constant; each head presenting a spherical guide surface toward the inner side thereof; a guide member at each end of the connecting link and presenting a complementary socket rotatably receiving the spherical guide surface of the associated head, means supporting each guide member for movement relative to the associated outer bearing member in a longitudinal direction relative to the connecting link; and resilient means at each end of the connecting link biasing the guide member toward the outer bearing surface at that end to urge the inner and outer bearing surfaces toward a normal position in which the connecting link is located substantially at right angles to the planes in which the outer bearing surfaces are movable.

3. A coupling as claimed in claim 2, and at each end of the connecting link a mounting member fast with the associated outer bearing surface and movably receiving the associated guide member; and retaining means fast with the mounting member, the associated resilient means being located between the retaining means and the guide member.

4. A vehicle suspension incorporating a coupling comprising means defining a pair of spaced-apart convex outer bearing surfaces; a connecting link disposed between the outer bearing surfaces; means defining a convex inner bearing surface fast with the connecting link at each end thereof and engaging a said outer bearing surface at that end, means supporting the inner and outer bearing surfaces at each end of the connecting link for relative movement in contact with each other and for limited relative movement of the outer bearing surfaces in substantially parallel planes located transversely to the connecting link with the spacing between the planes remaining substantially constant; and control means at each end of the connecting link resiliently urging the inner and outer bearing surfaces into contact with each other and resiliently biasing the outer bearing surfaces toward a normal position in which the connecting link is located substantially at right angles to the planes in which the outer bearing surfaces are movable.

5. A vehicle suspension incorporating a coupling comprising means defining a pair of spaced-apart convex outer bearing surfaces; a connecting link disposed between the outer bearing surfaces; a head fast with the connecting link at each end thereof; each head having a convex inner bearing surface at the outer end thereof and engaging a said outer bearing surface at that end, means supporting the inner and outer bearing surfaces at each end of the connecting link for relative movement in contact with each other and for limited relative movement of the outer bearing surfaces in substantially parallel planes located transversely to the connecting link with the spacing between the planes remaining substantially constant; each head presenting a spherical guide surface toward the inner side thereof; a guide member at each end of the connecting link and presenting a complementary socket rotatably receiving the spherical guide surface of the associated head, means supporting each guide member for movement relative to the associated outer bearing member in a longitudinal direction relative to the connecting link; and resilient means at each end of the connecting link biasing the guide member toward the outer bearing surface at that end to urge the inner and outer bearing surfaces into contact with each other and to bias the outer bearing surfaces substantially toward a normal position in which the connecting link is located at right angles to the planes in which the outer bearing surfaces are movable.

References Cited
UNITED STATES PATENTS

| | | | |
|---|---|---|---|
| 1,887,544 | 11/1932 | Codd | 301—36 |
| 2,082,384 | 6/1937 | Dunn | 301—5 |
| 2,968,936 | 1/1961 | Croset | 64—7 |

FOREIGN PATENTS

| | | |
|---|---|---|
| 507,313 | 6/1939 | Great Britain. |
| 439,126 | 9/1948 | Italy. |

RICHARD J. JOHNSON, *Primary Examiner.*